W. T. ERICKSON.
VEHICLE TIRE.
APPLICATION FILED AUG. 19, 1913.
1,151,868. Patented Aug. 31, 1915.
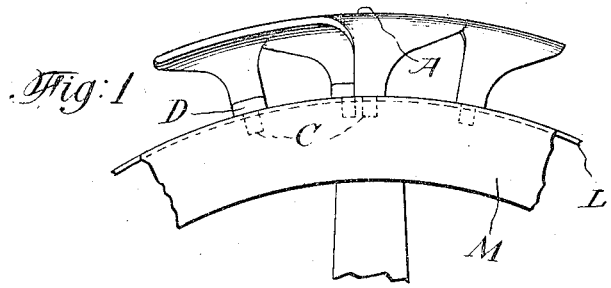
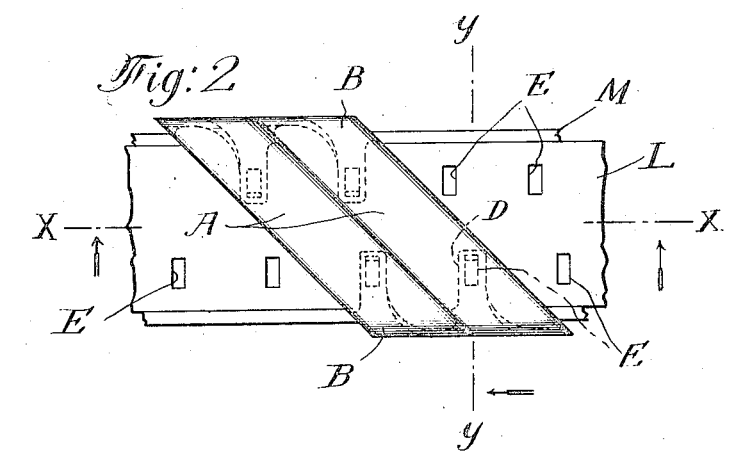
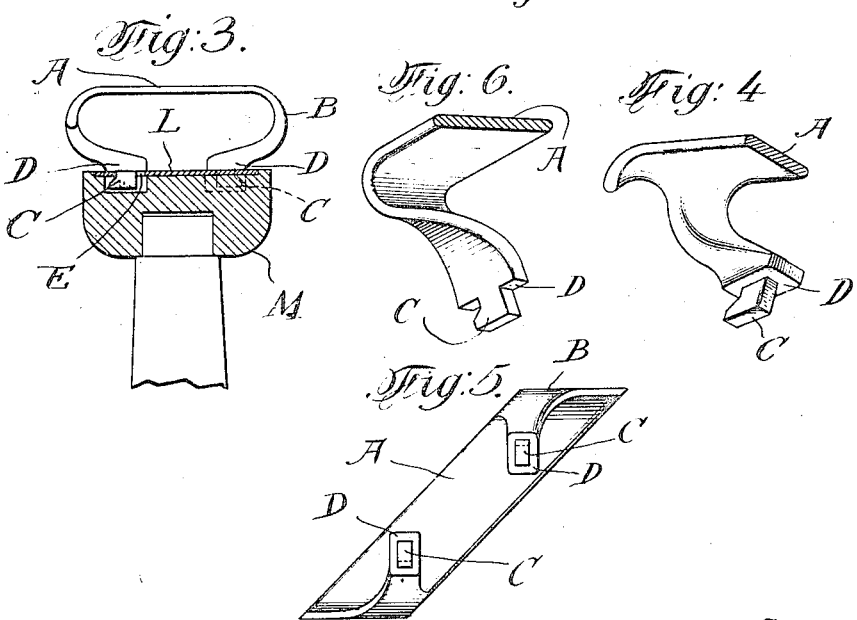
Witnesses:
John J. Kittel
Teresa F. Lynch
Inventor
William T. Erickson
By his Attorney

UNITED STATES PATENT OFFICE.

WILLIAM T. ERICKSON, OF NEW YORK, N. Y.

VEHICLE-TIRE.

1,151,868.  Specification of Letters Patent.  Patented Aug. 31, 1915.

Application filed August 19, 1913. Serial No. 785,486.

*To all whom it may concern:*

Be it known that I, WILLIAM T. ERICKSON, a citizen of the United States, and a resident of the borough of Manhattan, in the county of New York, city and State of New York, have invented certain new and useful Improvements in Vehicle-Tires, of which the following is a specification.

My invention has for its object a vehicle tire comprising a series of independent resilient members preferably arranged diagonally to the rim of the wheel forming a substantially inclosed tubular structure, and so shaped as not to unnecessarily decrease the strength of the non-resilient supporting member to which they are attached. By arranging the members diagonally a number of them are brought into action at one time, thus increasing the resiliency of the tire and decreasing the load upon any one member. This diagonal arrangement also renders the tire less liable to skid. These members may be of such a shape and arrangement that one or more of them may be easily removed and replaced, if necessary, without interfering with the others. In order that a tire of this general form may be practically effective, it is imperative that the holes necessary in the supporting member should be of such a character, extent and position as not to unduly weaken it and this is permitted by the character, shape and size of the resilient members of my new tire.

Reference is to be had to the accompanying drawings forming a part of the specification, in which similar characters of reference indicate corresponding parts in the various views.

Figure 1 is a side view in section of a portion of a wheel equipped with my tire. Fig. 2 is a top plan view showing two leaves or members of my tire. Fig. 3 is a cross section through y—y of Fig. 2 showing the felly or rim M and L in cross-section. Fig. 4 is a broken perspective view of one leaf or member of my new tire, showing one form of attaching means. Fig. 5 is a bottom view of one form of a leaf or member of my new tire. Fig. 6 is a bottom view of one form of a leaf or member of my new tire having a twisted extremity.

The wheel tire is composed of a plurality of resilient leaves, as shown in Fig. 5, situated in juxtaposition to each other in a plane diagonal to the rim M of the wheel to which they are attached directly or through the medium of a superimposed non-resilient rim L. Each of the resilient leaves is of a comparative arch shape, the central portion A of which may be either flat or curved as desired. The central portion of these leaves is of a breadth suitable for the purpose desired, the size of the wheel and the load weight to be carried. Each extremity B of a leaf is extended downwardly and inwardly and terminates in a connecting means C above which is a shoulder or abutment D. In the form of device shown in Fig. 6 the same result may be obtained if the leaf retains its width down to the abutment D, the connecting means C being of a smaller size than the width of the leaf at its central portion A. The extremities extend downwardly and inwardly and are decreased in size in order to give greater resiliency to the tire and to reduce the size of the openings E in the supporting member L and to cause said openings to be of such a distance apart as to insure sufficient strength to the supporting member. It is evident that if the leaves were not reduced in size at the point of junction with the supporting member, the openings would be so close together as to materially weaken the supporting member and render it unsafe. By extending the leaves inwardly the openings in the supporting member can be introduced at a convenient and safe distance from the edge thereof.

The mode of attachment in the particular form of my invention illustrated in the drawings is shown in Fig. 3. The connecting members C C are passed through the holes E E in the supporting member L and the resiliency of the leaf will thereby materially assist in holding said leaf in position, the shoulder or abutment D resting upon the upper surface of L and prevent the leaf from being forced downwardly through the holes E.

The edges of the leaves may be rounded in order to facilitate their resumption to their original position should they become overlapped.

The holes E E are situated in the supporting member L in such positions that the leaves of the tire will be in juxtaposition to each other and disposed diagonally across the rim of the wheel.

If the extending attaching extremities of the leaves be all of the same length, the holes will be in continuous alinement, as shown in Fig. 2. To attach the leaves to the supporting member to form the tire, as illustrated, the two extremities are compressed slightly, the fastening ends C C are inserted through the holes E E and the compression released.

It is evident that the particular size, shape and arrangement of the leaves or members and of their attaching means may be varied from the particular form illustrated in the accompanying drawing, without going beyond the scope of my invention which is a vehicle tire comprised of a plurality of resilient members in juxtaposition to each other in a plane preferably diagonal to the rim of the wheel and attached thereto.

What is claimed is:

1. In combination with the periphery of a wheel, a tread composed of a plurality of diagonally disposed flat resilient members, said members being bent downwardly and angularly twisted until they are substantially perpendicular to the edge of the wheel and terminating in shoulders capable of abutment against the periphery when the ends of the resilient members are inserted through openings in the periphery, and fastening ends capable of removable insertion in the openings in the periphery.

2. In combination with the periphery of a wheel, a tread composed of a plurality of diagonally disposed flat resilient members, said members being extended downwardly and inwardly and terminating in a holding member comprising an extended L-shaped lug with which the end of the resilient member forms a shoulder, the holding members being capable of removable insertion in openings in the periphery.

Signed at New York city, in the county of New York and State of New York, this 16th day of August, 1913.

WILLIAM T. ERICKSON.

Witnesses:
RITA LYNCH,
LAURA E. SMITH.